United States Patent [19]
Phillips et al.

[11] 4,204,659
[45] May 27, 1980

[54] ENERGY ABSORBER

[75] Inventors: Norman S. Phillips; William B. Walcott, both of Dayton, Ohio

[73] Assignee: The United States of America as represented by the Secretary of the Navy, Washington, D.C.

[21] Appl. No.: 899,956

[22] Filed: Apr. 25, 1978

[51] Int. Cl.² ............................................. B60R 21/10
[52] U.S. Cl. .................................. 248/562; 188/1 B; 248/548
[58] Field of Search ............... 248/548, 562, 573, 636, 248/400, 401; 267/131; 52/167; 188/1 B; 297/216

[56] References Cited

U.S. PATENT DOCUMENTS

| | | | |
|---|---|---|---|
| 2,272,344 | 2/1942 | Kimbro | 248/562 |
| 3,059,966 | 10/1962 | Spielman | 297/216 |
| 3,095,170 | 6/1963 | Harb | 297/216 X |
| 3,162,479 | 12/1964 | Hewitt | 296/35 R |
| 3,421,361 | 1/1969 | Stowell | 188/1 B X |
| 3,459,395 | 8/1969 | Scotto | 248/573 |
| 3,572,621 | 3/1971 | Whitten | 248/548 |
| 3,701,499 | 10/1972 | Schubert | 188/1 B X |
| 3,794,277 | 2/1974 | Smedley | 248/548 |
| 3,985,388 | 10/1976 | Hogan | 297/216 |
| 4,128,217 | 12/1978 | Mazelsky | 297/216 |

Primary Examiner—J. Franklin Foss
Attorney, Agent, or Firm—R. S. Sciascia; Henry Hansen; Stanton D. Weinstein

[57] ABSTRACT

A notched-energy absorber for attenuating high level accelerations such as would occur during aircraft crashes, thereby avoiding injury to a user. The energy absorber force-displacement curve has a large initial spike, followed by a valley or "notch" and then by a constant force level intermediate the spike and valley levels. In one embodiment, a conventional square-response type shock absorber is connected between a vehicle seat and the vehicle body by a shearable diaphragm fixed to vehicle structure. The diaphragm shears at a notch when it experiences an initial high force, after which the conventional absorber moves freely without deforming until it encounters a stop. The conventional absorber then elongates or compresses in a conventional manner. In an alternative embodiment, a spring is connected between the seat and the vehicle body. Initially, the spring is compressed by experienced forces until at a predetermined force level it forces out a retaining clip or ring. The spring thereupon crushes a honeycomb, forming the valley or "notch." After the honeycomb is crushed, a conventional shock absorber attached thereto is compressed in a conventional manner.

19 Claims, 7 Drawing Figures

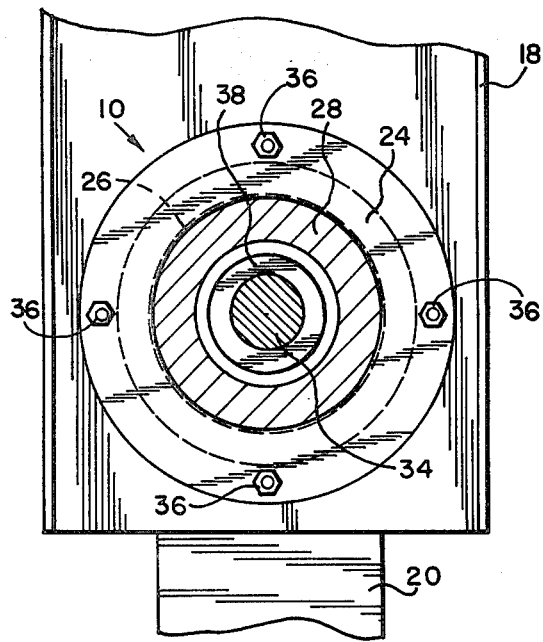
FIG. 4
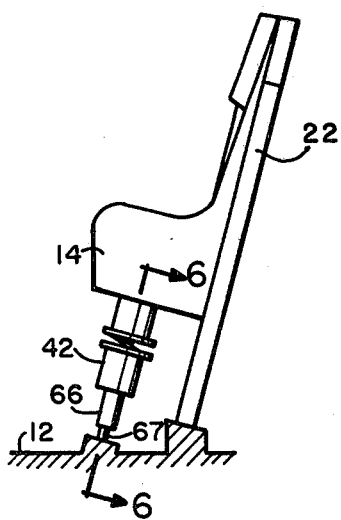
FIG. 5
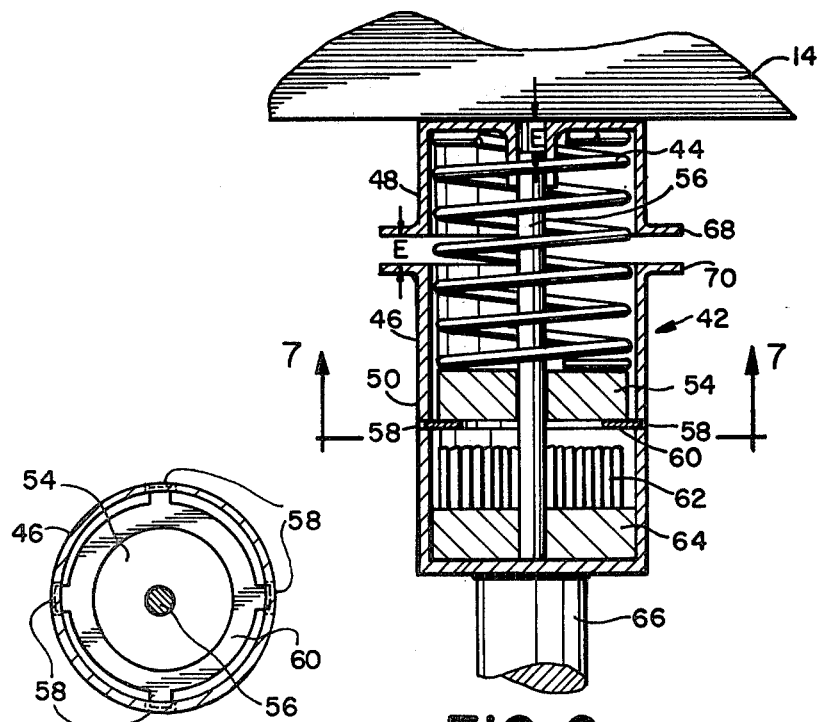
FIG. 6
FIG. 7

ENERGY ABSORBER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to energy absorbing devices, and more particularly to energy absorbers for attenuating high accelerations such as are caused by aircraft or other vehicle crashes.

For greater protection of, and reduction of injuries sustained by, seated pilots and passengers in aircrat or other conveyances or vehicles during potentially survivable crash environments, a proper energy absorber should be installed between the seat and the body of the vehicle. Such a device must not transmit acceleration levels that are injurious to the subject. However, most energy absorbers currently available, such as commercially available shock absorbers, are designed to protect rigid payloads, not dynamic systems such as are humans, and so would not adequately protect a seated man from high impact loads such as those occurring during a potentially survivable crash. Such available devices stroke at a constant force level, producing a constant force over their stroke length.

SUMMARY OF THE INVENTION

Accordingly, it is the general purpose of the present invention to provide an energy absorber capable of attenuating acceleration loads.

Other objects of the present invention are to provide an energy absorber capable of attenuating high impact or acceleration loads on a dynamic system such as a person, effectively protecting such a system from high impact loads such as would occur during a potentially survivable crash of a vehicle in which the person is a passenger and reducing potential injury to him therefrom, and maintaining the person at a potentially survivable level.

A still further object of the present invention is to provide an energy absorber having a minimum stroke while creating a tolerable environment for a dynamic system such as a human.

Briefly, these and other objects of the present invention are accomplished by an energy absorber whose response to force applied thereto results in force levels transmitted to the protected mass or system, with respect to absorber displacement or stroke, comprising an initial high peak or impulse, followed by a low valley or notch, followed by a constant intermediate force level plateau. The peak-valley portion of the curve accelerates the man up to a maximum velocity change and the plateau value maintains him at a survivable level. The notch can be generated by a physical separation of load carrying material, or by a reduced strength material. Any conventional constant force level absorber can be used to generate the remaining plateau portion of the response curve. In one embodiment of the present invention, a conventional shock absorber in series with a rupturing diaphragm generates the peak-valley-plateau waveform. A conventional shock absorber is connected in series with a notched diaphragm between the user's seat and the aircraft or other vehicle body. The diaphragm shears at its notch upon experiencing the peak force. Following breaking of the diaphragm, the protected system and conventional absorber are allowed to move freely without extension or compression of the conventional absorber, forming the valley, until a stop or collar fixed to the conventional absorber is engaged by structure fixed to the vehicle body. When this stop is engaged by a ring fixed to the protected mass or system and slidably disposed on the conventional absorber, the absorber then is compressed or extended conventionally to form the intermediate level plateau of the force-displacement curve of the present invention. In an alternative embodiment, a spring acts against a retaining ring or clip which is forced out of position by the peak transmitted load, after which the spring is urged against a honeycomb which is thereby crushed, forming the notch or valley. After the honeycomb is crushed, a conventional energy absorbing device is actuated, providing the plateau portion of the curve.

Other objects, advantages and novel features of the invention will become apparent from the following detailed description of the invention when considered in conjunction with the accompanying drawings wherein:

BRIEF DESCRIPTION OF THE DRAWINGS

FIG. 4 is a section of the energy absorber of FIG. 3 taken along the line 4—4;

FIG. 5 shows a schematic representation of an aircraft seat and another preferred embodiment of an energy absorber according to the invention installed therein;

FIG. 6 is a section of the apparatus of FIG. 5 taken along the line 6—6 and showing the energy absorber in greater detail in an enlarged view with a portion shown in a sectional view; and FIG. 7 is a section of the energy absorber taken along the line 7—7 of FIG. 6.

DESCRIPTION OF THE PREFERRED EMBODIMENT

It is desirable that, in order to provide a person with adequate protection from injury, the person should be kept at a survivable level with a low probability of injury. Where this is accomplished with an energy absorber, displacement of the absorber should be minimized, particularly where there is limited space available to accommodate such displacement. This minimization with protection can be accomplished by bringing the person to the survivable level quickly, and then maintaining him at that level.

Figure 1:
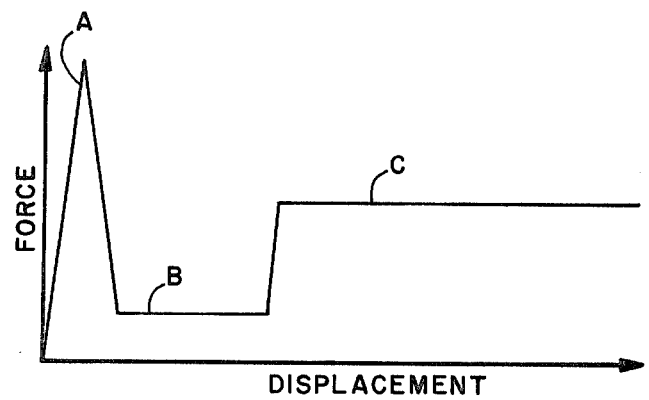
FIG. 1 is the force-displacement response curve of the invention.

Referring now to the drawings, wherein like reference characters designate like or corresponding parts throughout the several views, there is shown in FIG. 1 an empirically determined notched force-stroke or force-displacement profile for an energy absorber according to the present invention for which injury reduction capability is optimized. This waveform shows the amplitude of the force transmitted by the absorber to the mass or system protected by the absorber, versus the displacement or stroke of the absorber in response to experienced forces. This waveform comprises an initial high force level peak or spike A followed by a low force level valley or notch B which in turn is followed by a constant or nearly constant force level plateau C whose force level is intermediate those of the peak and notch. The purpose of this response is to maintain the person at a surviviable level, where the probability of spinal injury to the person, the most likely initial injury, is minimized at 5% or less. The peak A and valley B portion accelerates the person up to a maximum velocity change, and the plateau C maintains the person at a survivable level. The initial peak or spike A, because of the dynamic response of the person, quickly achieves the acceleration or force response level of the person desired for protection of the person and reduces the absorber stroke required to adequately protect the person. However, to prevent increasing the probability of spinal injury to an undesirable level, any subsequent forces applied to the person to maintain the desired level must be preceded by a low level notch or valley B. The notch B prevents the collective acceleration experienced by the person from exceeding the desired level; the initial input A accelerates the person, but before the acceleration becomes too great that input is removed. The subsequent plateau C maintains the person's acceleration level at the constant desired survivable value. The result is that the acceleration experienced by the person causes him to compress up to a given level which is maintained. For example, peak A can have a peak force level of 5500 pounds with 0.184 inch displacement, notch B can have a constant force level of 1000 pounds with an additional 1.0 inch displacement, and plateau C can have a constant force level of 4400 pounds. As another example, the peak force can be 8600 pounds, the notch force can be minimal, and the plateau force can be constant and 3688 pounds. This waveform should be optimized for the anticipated user weight, seat weight, and vehicle deceleration. For example, for the optimized waveform values for a man weight of 170 pounds, a seat weight of 115 pounds, and the vertical deceleration pulse associated with the 95th percentile survivable accident for rotary wing and light fixed wing aircraft, the initial force and displacement are zero, the peak is 8500 pounds force at 0.2 inches displacement, the valley is at 1000 pounds force through 0.7 inches total displacement, and the plateau is 4000 pounds force for any further displacement, to for example 25 inches total displacement. The vertical deceleration pulse associated with the 95th percentile survivable accident for rotary wing and light fixed wing aircraft can be obtained from Turnbow, J. W., Carroll, D. F., Haley, J. L., Jr., and Robertson, S. H. *Crash Survival Design Guide*, USAAVLABS Technical Report 70-22, AvSer 69-4, rev. August 1969 (N.T.I.S. Accession No. AD-695 648), p. 21-22. For further information see Phillips, N. S., Carr, R. W. and Scranton, R. S., *A Statistical Investigation into the Development of Energy Absorber Design Criteria*, Report NADC-CS-7122, Dec., 30, 1971 (N.T.I.S. Accession No. AD-749 333).

Figure 2:
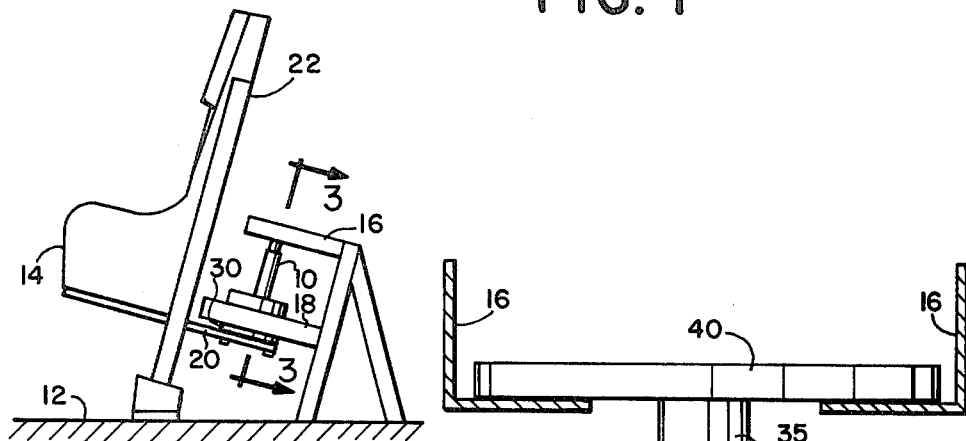
FIG. 2 shows a schematic representation of an aircraft seat and a preferred embodiment of an energy absorber according to the invention installed therein.
Figure 3:
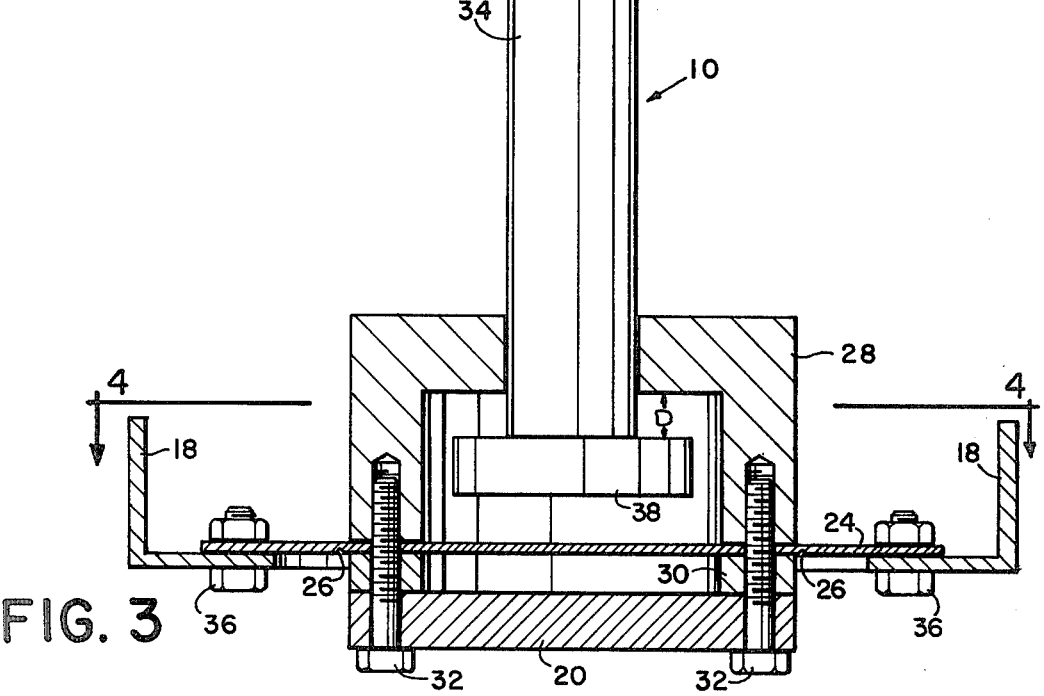
FIG. 3 is a section of the apparatus of FIG. 2 taken along the line 3—3 and showing the energy absorber in greater detail in an enlarged view with a portion shown in a sectional view.

There is shown in FIGS. 2-4 an energy absorber 10 according to the present invention and operating according to the curve of FIG. 1, connected between the aircraft or other vehicle body or other structure 12 and the user's seat or chair 14 by mounts or brackets 16, 18 and 20. The connection of absorber 10 to the vehicle body 12 can be to the vehicle floor. Seat 14 is configured to slide, such as on rollers, up and down rails 22, such as is the case with an aircraft ejection seat. Absorber 10 includes a rigid diaphragm or plate 24 having a notch 26 and sandwiched between rigid circular rings 28 and 30 which are fastened thereto and to mount 20 by bolts 32 or by any other suitable means. Ring 30 is attached to the user's seat 14 by mount 20, and ring 28 is configured to slide over conventional absorber 34. Conventional absorber 34 includes a portion 35 configured to slide in conventional absorber 34. Mount 16 rigidly attached flange 40, attached to portion 35 of conventional absorber 34, to vehicle body 12. Mount 18, fastened to diaphragm 24 such as by bolts 36, rigidly connects diaphragm 24 to vehicle body 12. For most effective breaking, diaphragm 24 has a notch 26 preferably concentric with conventional absorber 34 and with rings 28 and 30 and is preferably closely spaced about rings 28 and 30. Conventional absorber 34 can for example be any single-stage extension -type conventional absorber having a square or trapezoidal shaped force/-stroke response curve such as an automobile fluid-type shock absorber or the absorbing device disclosed in U.S. Pat. No. 3,369,634 to Bernard Mazelsky. Impact base or collar 38 can be a ring or plate or other member attached, such as by a bolt or other suitable means, to the end of absorber 34 opposite portion 35.

Initially, seat 14 is supported on and connected to body 12 by mount 20, ring 30, diaphragm 24 and mount 18, which limit or prevent relative movement of seat 14 with respect to body 12. At impact, the seat 14 inertial force passes through mounting bracket 20 and ring 30 into diaphragm 24. No load can now be transferred into conventional absorber 34 nor mount 16 because there is a space D between ring 28 and impact base or collar 38 attached to absorber 34. The breaking point of notch 26 of diaphragm 24 corresponds to the peak force of the first portion A of the curve of FIG. 1. Because both rings 28 and 30 are rigid, diaphragm 24 will shear cleanly at the reduced thickness of notch 26. For example, a diaphragm plate 24 of 2024 aluminum, 0.125 inches thick, with a scribed circular notch of approximately 0.060 inch thickness would cause an 8600 pound peak force. Once the diaphragm 24 has ruptured under peak load, the support provided by mount 18 and the diaphragm is removed. Between shearing of diaphragm 24 at notch 26 and contact of ring 28 with collar or impact base 38, there is no solid physical connection between body 12 and seat 14, resulting in a valley B, or period of low force versus absorber 10 stroke or displacement, following breaking of the diaphragm. Seat 14 then drop the distance D between ring 28 and impact base or collar 38, forming notch B, after which absorber 34 elongates to form plateau C. After impact base or collar 38 fixed to conventional absorber 34 contacts ring 28, normal operation of conventional absorber 34 ensues, producing the intermediate level plateau portion C of the curve of FIG. 1. The force, then applied to absorber 10, is transmitted through ring 28 into the energy absorber attachment 38 and through conventional absorber 34 into the upper support structure 16. With the space D between impact base 38 and ring 28, the notch B force is a minimum force. However, it may be desired to insert crushable material therein. For adjustment of the slope of the leading edge of peak A, diaphragm 24 can be flexible instead of rigid, so that the diaphragm distends appropriately under applied force before breaking, but still limits relative movement of seat 14 with respect to body 12.

There is shown in FIGS. 5-7 an alternative energy absorber 42 according to the present invention and operating according to the curve of FIG. 1, connected between the aircraft or other vehicle body 12 and the user's seat or chair 14. Absorber 42 includes a spring 44 contained within a casing 46 which can for example be cylindrical, and which provides the initial linear portion of, and determines the slope of the leading edge of, the initial spike or peak portion A of the curve of FIG. 1. Casing 46 is divided into two casing portions 48 and 50 initially separating a distance E by a clearance space. The external end of casing portion 48 abutting seat 14 is initially spaced from the corresponding proximate end of guide 56 by an equal distance E. Spring 44 disposed within casing 46 urges apart casing portion 48 and plunger 54 slidably disposed within casing portion 50. Support guide 56 located at the longitudinal axis of casing 46 keeps plunger 54 properly aligned with respect to casing 46, and keeps cylinder portion 48 properly aligned with respect to cylinder portion 50, during motion thereof. Casing portion 50 is provided with a plurality of holes or slots 58, for example four, to accommodate a retaining ring or clip 60, which can for example be a spring steel clip, which while in place limits or prevents movement of plunger 54 with respect to cylinder portion 50. For example, ring 60 can include lugs or ears, each configured to slidably fit in a slot 58. Ring 60 thus isolates spring 44 from honeycomb or other crushable material 62. Honeycomb or other crushable material 62 rests on and is supported by solid filler block 64, which also helps align support guide 56 in casing 46. Block 64 can rest on or be connected to casing portion 50 adjacent conventional absorber 66.

The initial force applied to absorber 42 causes casing portions 48 and 50 to compress spring 44. Also, piston 54 presses against ring 60, which deforms thereby. When the peak force of the spike is reached, plunger 54 forces retaining ring 60 out of slots 58 in casing portion 50 and the spring 44 force no longer acts through casing portion 50. Instead, spring 44 now imposes a force on honeycomb 62 which collapses and produces a constant force level for the notch section B of the force/displacement curve of FIG. 1. Honeycomb 62 crushes until the clearance space E has been taken up and flanges 68 and 70 of respective casing portions 48 and 50 touch. Attached to casing portion 50, such as by welding, bonding, bolting or any other conventional means, is a commercially available compression-type energy absorbing device 66 which is actuated and experiences sufficient imposed forces to stroke or compress after clearance space E has been taken up, and provides the plateau portion C of the curve of FIG. 1. Conventional absorber 66 can for example, be any single-stage compression-type conventional absorber having a square or trapezoidal shaped force/stroke response curve such as an automobile fluid-type shock absorber or the absorbing device disclosed in U.S. Pat. No. 3,369,634 to Bernard Mazelsky. Portion 67 of conventional absorber 66 is configured to slide in conventional absorber 66, and is attached to body 12. Thus, spring 42 and ring 60 provide the peak or spike A of FIG. 1, honeycomb 62 provides the notch or valley B, and conventional absorber 66 provides the intermediate level plateau C. A breakable diaphragm can be used in place of ring 60. Also, flange 68 can be provided with a lip configured to engage flange 70 to limit separation of casing portions 48 and 50, to prevent accidental disassembly of absorber 42. Such accidental disassembly could also be prevented by the weight of seat 14. In addition, spring 44 and plunger 54 could, if desired, be replaced with a single solid plunger fixed to casing portion 48 and configured to engage ring 60. Furthermore, casing 46 can have other shapes than cylindrical, and retaining ring or clip 60 need not be circular. In addition, other configurations than the one shown in FIGS. 6 and 7 for retaining ring or clip 60 can be used.

In summary, operation of the foregoing invention is as follows. The present invention operates according to the force-displacement curve shown in FIG. 1. For the embodiment of the present invention shown in FIGS. 2-4, when force is first applied to absorber 10, diaphragm 24 is loaded until it breaks at notch 26 when the predetermined peak force is reached, thereby forming peak portion A of the curve of FIG. 1. Thereafter, ring 28 fixed to the vehicle body 12 slides freely through distance D on conventional absorber 20, thereby forming the notch or valley B of the curve of FIG. 1, until it contacts impact base or collar 38 fixed to conventional absorber 34. Thereafter, conventional absorber 34 is directly connected between the user's seat 14 and the vehicle body 12, and operates conventionally to form the intermediate force level portion C of the curve of FIG. 1. For the embodiment of the invention shown in FIGS. 5-7, when absorber 42 experiences initial loading, spring 44 is compressed in casing 46 until retaining clip 60 is forced out of cutouts or holes 58 in casing 46 at peak A force, after which spring 44 crushes honeycomb 62, forming the notch portion B of the curve of FIG. 1. After honeycomb 62 has been crushed sufficiently to close clearance space E, conventional absorber 66 provides the plateau portion C of the curve of FIG. 1.

It should be understood that conventional absorbers 34 and 66 can be arranged with respect to the user's seat 14 and the vehicle or other conveyance body or fuselage 12 such that compression-type or extension-type conventional absorbers can be utilized in any embodiment of the present invention. Also, the notch portion B of the curve of FIG. 1 can be provided using open space, permitting the seat to move freely between shearing of a breakable member and operation of the conventional absorber, or using crushable material, depending on the type, duration, and force level desired for the notch. Also, the present invention can be utilized in other conveyances than aircraft, such as racing cars, automobiles, or ships. In addition, any device capable of firm connection releasable at a predetermined force level can be used in place of diaphragm 24 or clip 60. Notch B can be generated by a physical separation of load carrying material or by reduced strength material.

Thus, there has been provided novel energy absorbing apparatus. The present invention deforms according to a force-displacement curve for optimal protection of the user from excessive forces of high impacts. The invention effectively protects human beings from high level input accelerations, such as occur during potentially survivable aircraft crashes. In particular, the probability of spinal injury to the user is substantially reduced.

Obviously, many modifications and variations of the present invention are possible in light of the above teachings. It is therefore to be understood that within the scope of the appended claims the invention may be practiced otherwise than as specifically described.

What is claimed is:

1. Apparatus for absorption of forces from a support structure imposed upon a mass movable with respect thereto, comprising:
   lost motion means adapted to be connected between the mass and the support structure for introducing lost motion between the support structure and the mass for a preset limited relative displacement of the mass with respect to the support structure; and
   constant level means connected to said lost motion means and adapted to be connected between the mass and the support structure upon accomplishment of the lost motion, for maintaining the forces received by the mass at a predetermined constant level after completion of the lost motion.

2. Apparatus as recited in claim 1 wherein said constant level means comprises a shock absorber.

3. Apparatus as recited in claim 1 wherein said lost motion means comprises:
   first means adapted to be connected between the mass and the support structure for limiting displacement of the mass with respect to the support structure until the forces reach a preset peak level; and
   second means connected to said first means and adapted to be connected between the mass and the support structure after the forces reach the peak level for limiting to a preset maximum level the forces received by the mass until a preset displacement of the mass with respect to the support structure is accomplished.

4. Apparatus as recited in claim 3 wherein said second means comprises a crushable member.

5. Apparatus as recited in claim 4 wherein said crushable member comprises a honeycomb.

6. Apparatus as recited in claim 3 wherein said first means comprises:
   spacer means adapted to be releasably connected between the mass and the support structure for maintaining the mass and the support structure in spaced relationship until the peak level is reached.

7. Apparatus as recited in claim 6 wherein said spacer means comprises a member configured to break upon experiencing the peak level.

8. Apparatus as recited in claim 7 wherein said member comprises a diaphragm.

9. Apparatus as recited in claim 6 wherein said first means further comprises force exerting means operatively connected to said spacer means for transmitting the forces to said spacer means.

10. Apparatus as recited in claim 9 wherein said lost motion means further comprises aligning means for aligning said force exerting means with respect to said spacer means and said second means.

11. Apparatus as recited in claim 9 wherein said force exerting means comprises a spring.

12. Apparatus as recited in claim 9 wherein said force exerting means comprises a plunger.

13. Apparatus as recited in claim 9 wherein said spacer means comprises a breakable member.

14. Apparatus as recited in claim 9 wherein said spacer means comprises a yieldable member.

15. Apparatus as recited in claim 14 wherein said yieldable member comprises an annular member having projections.

16. Apparatus as recited in claim 3 wherein said first means comprises:
   first and second retaining means adapted to be connected between the mass and the support structure for limiting movement of the mass relative to the support structure upon completion of the lost motion;
   plunger means connected to one of said retaining means and slidably disposed within the other of said retaining means for transmitting the forces to said other retaining means; and
   yieldable means releasably connected to said other retaining means for limiting movement of said plunger means until the peak level is reached.

17. Apparatus as recited in claim 16 further comprising aligning means connected to said first retaining means and slidably disposed in said second retaining means for aligning said first retaining means relative to said second retaining means.

18. Apparatus as recited in claim 16 wherein said yieldable means comprises an annular member having projections configured to engage said other retaining means until the peak level is reached.

19. Apparatus for absorption of forces from a support structure imposed upon a mass movable with respect thereto, comprising:
   first means adapted to be connected between the support structure and the mass for limiting movement of the mass with respect to the support structure until the forces reach a first level;
   second means connected to said first means and adapted to be connected between the support structure and the mass when the forces reach the first level for limiting the forces to be below a second level below the first level after the first level is reached and until a first displacement of the mass relative to the support structure is completed; and
   third means adapted to be connected between the support structure and the mass when the first displacement is completed for limiting the level of the forces to be below a third level intermediate the first and second levels after the first displacement is completed.

* * * * *